United States Patent [19]

Walisser

[11] Patent Number: 4,757,108
[45] Date of Patent: Jul. 12, 1988

[54] WATER SOLUBLE PHENOLIC RESOLE-UREA COMPOSITION

[75] Inventor: Wayne R. Walisser, Ladner, Canada

[73] Assignee: Borden, Inc., Columbus, Ohio

[21] Appl. No.: 875,536

[22] Filed: Jun. 18, 1986

[51] Int. Cl.$^4$ ............................................. C08G 8/28
[52] U.S. Cl. ................................. 524/596; 528/164; 528/143
[58] Field of Search ................ 524/596, 164; 528/143

[56] References Cited

U.S. PATENT DOCUMENTS

| Re. 30,375 | 8/1980 | Deuzman | 525/498 |
|---|---|---|---|
| 3,072,595 | 1/1963 | Barth | 525/498 |
| 3,594,343 | 7/1971 | Huck | 528/164 |
| 3,616,179 | 10/1971 | McCombs | 161/170 |
| 3,907,724 | 9/1975 | Higginbottom | 161/93 |
| 3,919,134 | 11/1975 | Higginbottom | 428/290 |
| 3,956,204 | 5/1976 | Higginbottom | 525/498 |
| 3,956,205 | 5/1976 | Higginbottom | 525/498 |
| 4,060,504 | 11/1977 | Higginbottom | 528/162 |
| 4,176,105 | 11/1979 | Miedaner | 525/504 |
| 4,710,406 | 12/1987 | Fugier | 524/596 |

FOREIGN PATENT DOCUMENTS

| 683139 | 3/1964 | Canada . |
|---|---|---|
| 1001788 | 12/1976 | Canada . |
| 1026882 | 2/1978 | Canada . |
| 1049172 | 2/1979 | Canada . |
| 1056973 | 6/1979 | Canada . |
| 1077179 | 5/1980 | Canada . |
| 1080871 | 7/1980 | Canada . |

OTHER PUBLICATIONS

Chem. Abstract 103:216573g.

*Primary Examiner*—C. Warren Ivy
*Attorney, Agent, or Firm*—Robbins & Laramie

[57] ABSTRACT

A water soluble phenolic resole-urea composition useful as a binder which remains infinitely water-dilutable and free of sediment after one month of storage at 0° C. and is made by the reaction of urea with the free formaldehyde in a phenolic resole under acid conditions, followed by the further addition of urea at neutral or slightly basic conditions.

41 Claims, No Drawings

WATER SOLUBLE PHENOLIC RESOLE-UREA COMPOSITION

FIELD OF THE INVENTION

This invention relates to the preparation of water soluble and storage stable resole methylene urea copolymer compositions that are useful as adhesives in the preparation of glass fiber thermal insulation, glass fiber acoustical insulation, glass fiber molded products (automotive, roof and hood liners), and uncured glass wool.

BACKGROUND OF THE INVENTION

The manufacture of mineral fiber thermal insulation is carried out according to one of a number of continuous processes werein the molten mineral material flowing from a melting furnace is divided into streams and attenuated into fibers. The fibers are collected in a felted haphazard manner to form a mat. In order to produce most thermal insulating products, the fibers must be bonded together in an integral structure. Thus, thermal insulation batts, acoustical tiles and similar structures, generally comprising glass wool, rock wool, or other mineral fibers, are held together by a resinous binder present in amounts of about 5-20% by weight to impart strength and resiliency to the structure and preserve original insulating, acoustical, dimensional and other properties.

To achieve this binding, a curable binder material is added to the mineral wool. The curable binder composition is generally formulated as a liquid to be sprayed onto the fibers as they are dropping onto the collecting conveyor belt, in the process of forming the mat. The layer of fiber with binder is then compressed and shaped into the form and dimensions of the desired thermal insulating product and passed through a curing oven.

Various materials have been used as binder ingredients including both organic and inorganic materials. The organic binder materials most commonly employed are heat-curable thermosetting resin systems of the phenol formaldehyde type.

Such binders are generally provided as water soluble or water dispersable compositions which can be easily blended with other ingredients and diluted to low concentrations which are readily sprayed onto the fiber as it falls onto the collecting conveyor. The binder composition is often applied in an amount such that the cured binder constitutes about 5% to about 10% by weight of the finished product, though it can be as little as 1% or less or as high as 20% or more, depending upon the type of fiber product. Optimally, the amount of binder for most thermal insulating products will be the amount necessary to lock each fiber into the mass by bonding the fibers where they cross or overlap. For this reason, the binder compositions should have good flow characteristics, so that the binder solution can be applied at a low volume that will flow to the fiber intersections.

Generally, the binder system requirements are for a low-cost water soluble or water dispersable composition which can be easily applied and readily cured during normal production cycles. The product should be relatively stable for periods of time long enough to permit mixing and application at temperatures ordinarily encountered in fiberizing plants, and the composition should be dilutable in order to permit variations in concentrations for different end products. The cured binder product must provide a strong bond with sufficient elasticity and thickness recovery to permit reasonable shipping and in-service deformation of the thermal insulating product. It should be moisture resistant so that it will not settle under humid conditions. The most important test of humidity resistance is thickness recovery upon the opening of a package of insulation that has been tightly wound under compression for packaging, shipping, and storage. After prolonged storage, such as for two weeks to 12 months in a warm and humid environment, such as may be found in Tampa, Fla., or in Washington, D.C. during the summer months, thickness recovery is important if full insulating value is to be obtained after installation. It should be odor free and non-corrosive to metals with which it comes in contact.

Typical binder compositions are prepared as aqueous solutions or dispersions of partially condensed phenolic formaldehyde resins to which are added a variety of modifiers or agents to improve the spraying, flowing or similar application characteristics as well as the bonding strength, temperature resistance and other in-service features of the cured resin.

A binder composition much desired is one that can withstand service temperatures of 700° F. to 900° F. Numerous attempts have been made to provide such high temperature-resistant binders with little acceptance for practical commercial utility. A particularly troublesome aspect of binders prepared from phenol formaldehyde resin systems is the tendency towards punking when subjected to temperatures in excess of 600° F., which are within the range of temperatures that may be encountered in use. The phenol formaldehyde resin system in the final thermoset stages can undergo exothermic oxidation. Since the mineral fiber product is an excellent heat insulator, the heat given off by any exothermic reaction in the binder is confined and becomes cumulative until temperatures are attained which cause thermal decomposition of the organic binder materials. In some instances, the decomposition products will have an ignition temperature lower than the corresponding temperature of the surrounding composition and may burst into flame.

The characteristic of exothermic decomposition without flame is referred to as "punking". It can continue at a slow rate for a considerable length of time, ultimately resulting in total decomposition of the binder with consequent deterioration of the fiberglass insulating product. Punking can be initiated in the cured phenolic binder systems by subjecting the thermal insulating product to elevated temperatures. There are very few mineral fiber thermal insulations produced with phenolic resin compositions that are commercially available at the present time which can withstand temperatures in excess of about 600° F. to 700° F., without punking, though numerous attempts have been made to formulate suitable binder compositions which can withstand high temperatures, since generally glass fibers can withstand temperatures up to 1200° F. to 1300° F. before softening. In fact, the glass fiber most commonly used in thermal insulating products at present has a Littleton softening point between 1250° F. and 1300° F. Accordingly, there is a definite need for a high temperature resistant binder which will extend the use of these glass fiber materials to high temperature service.

In the past, a variety of approaches have been taken in an effort to formulate high temperature binder compositions using phenolic resins as the primary binder ingredient. Modification of the phenolic formaldehyde by the addition of nitrogenous modifiers such as dicyandiamide is disclosed in U.S. Pat. No. 3,223,668. Others have tried the use of borates of various sorts as additions to the binder composition; U.S. Pat. Nos. 2,931,738, 3,002,857, 3,253,948, and 3,839,236.

There is also a need for phenolic resin binder materials that are water dilutable, non-punking, and that are stable under the refrigerated storage conditions often encountered in industrial situations.

As is pointed out in U.S. Pat. No. 3,072,595, urea has been used in the past in phenolic resin binders, primarily for its contribution of non-punking properties. Such non-punking binder compositions have heretofore been obtained chiefly by the use, in conjunction with a water soluble phenolic resin, of a urea or a urea-formaldehyde resin in sufficient quantity to provide about 15% by weight nitrogen based on total resin solids in the binder composition. These nonpunking compositions have been produced in various ways, namely simultaneous reaction of phenol, urea, and formaldehyde; reaction of phenol alcohols and urea; reaction of phenols and methylol ureas; and combinations of the foregoing. The cost of these non-punking resins, however, in terms of processing difficulties, erratic storage behavior, and precuring tendencies has made these urea-containing resins commercially unacceptable. The difficulties associated with these resins are, in general, attributable to the relatively great reactivity of urea.

The result of the presence of urea resins in previous non-punking insulating batt binders has been a marked lack of stability upon water dilution and a tendency to precure during batt manufacture.

In order for a resin to be commercially acceptable as a binder in insulation, the resin must have stability, i.e., show no signs of phase separation or the formation of hard, paste-like insoluble phases. Binders containing urea resin are often prone to undergo irreversible phase separation, and this tendency is increased when the resin is diluted with water. Frequently, this separation occurs in as few as five or six hours, and hence, prior art binders containing urea or urea resins are extremely disadvantageous from a processing standpoint and undesirable despite their non-punking character.

As described above, the binder is sprayed onto the molten material, cooling and coating the material to form coated fibers which form a mat. It has been found that binders containing urea resins are often either deficient in their degree of bond strength, or have a tendency to punk. This is because during the water/liquid binder spraying step the urea resin precures. As a result, the proportion of binder which actually is available for bonding is reduced. Unless the amount of binder is increased, the quality of the bond obtained is inferior. Increasing the binder in the batt increases the tendency to punk, since punking is roughly proportionate to binder content.

Additionally, the presence of urea resins in the batt bond may adversely affect water resistance. Cured urea-formaldehyde resins generally have poor humidity resistance and water resistance. Cured binder systems having a urea-formaldehyde resin content are, to the extent of that content, usually vulnerable to attack by water. When a binder mixture comprising a urea-formaldehyde resin and either a phenol or a phenolic resin is cured, little or no inter-reaction occurs between the urea resin and the phenol or the phenolic resin. This is because the reactivity of a urea resin molecule towards any other urea or urea resin molecules present is much greater than its reactivity towards a phenol or a phenolic resin. As a result, urea self-reaction or "homopolymerization" proceeds so quickly as to virtually exclude urea resin-phenol or urea resin-phenolic resin inter-reaction or "copolymerization". The cured product, therefore, is a mixture predominantly containing cured urea resin (homopolymer) and phenol, or cured phenolic resin (homopolymer) and very little, quite possibly no, urea-phenolic resin inter-reaction product (copolymer).

The use of urea solids in liquid phenolic resoles for inorganic or glass fiber bonding is known in the art and has achieved widespread commercial acceptance because:

(i) Urea imparts antipunk character to the resole.

(ii) Urea acts as a binder extender since it readily combines with the free formaldehyde in the resin under mildly alkaline or neutral pH conditions forming in situ methylol urea, a material that polymerizes readily under the curing conditions used in the fiber bonding process, forming urea formaldehyde adhesive.

(iii) Urea reduces the free formaldehyde content of the resole, thereby significantly reducing the release of formaldehyde from the resole, and the release of other volatiles as well. This reduction in volatiles increases retention of the binder on the hot glass fiber during application and during the curing process, and therefore improves efficiency.

(iv) Urea is presently approximately one-fifth the cost of solid phenolic resole and therefore acts as an economic extender.

The prior art teaches that urea should be added to the advanced resole shortly before the application of the liquid resole to the glass fibers to be bonded. This is necessary because when urea is added, methylol urea is immediately formed by the reaction of the urea with the free formaldehyde that is present in the resole solution. The methylol urea in turn polymerizes, causing a rapid loss of resin solubility in water. High resin solubility in water is necessary since dilution water must be added to the binder to cool the hot glass fibers during application and thereby prevent precuring of the resin. The dilution water is also used because it facilitates the even distribution of the relatively small amount of binder solids onto a large amount of glass fiber, and it also facilitates the desired flow of the resin.

It is possible to severely limit the polymerization reaction of methylol urea by storing the resulting methylol urea resole solution under refrigerated conditions; however, this results in the formation of precipitates of tetramethylol 4-4' dihydroxydiphenyl methane (tetra dimer) when the free formaldehyde content is below 2% of the solution.

The preparation of resoles containing 2-2' and 2-4' dihydroxydiphenyl methanes is described in the Higginbottom patents, U.S. Pat. Nos. 3,956,204, 3,956,205 and 4,060,504, and Canadian Patent No. 1,049,172. The preparation of resoles containing methyoxymethyl aminotriazines or methoxymethyl melamines is described in Canadian Patent No. 1,026,882, to Higginbottom. These compositions were developed for the purpose of inhibiting tetra dimer crystallization at low temperatures. These preparations have not achieved commercial acceptance because the resulting resoles are not fully soluble in water and require the addition of expensive proteinaceous emulsifiers to prevent the formation of sticky, gummy substances that plug application equipment when the resole solution is diluted with 10 to 20 parts of water prior to application.

In addition, the production of emulsifiable resoles normally requires an additional ingredient, commonly oxalic acid or sulfuric acid, to precipitate and thereby inactivate the commonly present divalent metal ion in the resole that would otherwise precipitate the proteinaceous emulsifier that is added to emulsify the resole upon dilution. The divalent ion is ordinarily an alkaline earth metal such as calcium, barium, or magnesium, whose oxide provides the necessary alkalinity to catalyze the formation of the resole from phenol and formaldehyde.

It is also known in the art to prepare a green low advanced resole where the tetramethylol 4-4' dihydroxydiphenyl methane (tetra dimer) concentration does not exceed more than about 5% of the total phenol originally present. Under these conditions, tetra dimer does not crystallize from solution at low temperature when urea is added to the resole. These conditions, however, necessitate that the resole contain large amounts of free phenol and monomethylol phenols since the reaction must be stopped normally by cooling and neutralization with acid before the reaction with phenol and formaldehyde is complete.

Continued high temperatures and alkalinity cause rapid condensation of the relatively high concentration of trimethylol phenol to tetra dimer. High concentrations of free phenol and of monomethylol phenol in the resole are undesirable because these materials are relatively volatile and vaporize readily in the hot air curing process after application of the solution to the hot glass fiber. Also, the free phenol and the monomethylol phenols are relatively unreactive towards polymerization with remaining methylol phenols and also are relatively unreactive towards copolymerization with the methylol ureas. This causes poor binder efficiency and performance.

The state of the art therefore makes it necessary for the manufacturers of glass fiber thermal insulation, who use resole resins, to add urea to the resole shortly before application to the glass fiber. This in turn necessitates maintaining an inventory of urea, and in many cases, also providing for expensive solids handling equipment for bulk urea. In addition, these manufacturers must also provide additional mixing equipment for combining the solid urea with the liquid resole prior to application to the glass fiber. Manufacturers of glass fiber products also find they must deal with the formaldehyde vapors associated with handling ordinary resoles which are most objectionable.

For economical, practical environmental and industrial hygenic reasons, resole urea compositions that are storage stable, fully soluble in water, and very low in free phenol and free formaldehyde content, have therefore been long sought-after by the phenol/formaldehyde, urea/formaldehyde resin adhesive manufacturing industry.

SUMMARY OF THE INVENTION

This invention accomplishes the cold storage stabilization of resole-urea solutions, by the in situ formation of urea-formaldehyde polymer (u-f polymer) of limited molecular weight. The u-f polymer is prepared in a carefully controlled acidification reaction. In this reaction, urea is added to the resole for reaction with the free formaldehyde present, the pH then ordinarily being on the alkaline side. The pH is then adjusted to be acidic and is maintained in an acidic pH range for a limited time at a slightly elevated temperature. At the end of the limited time, the resin solution is neutralized, allowed to cool, and is then ready for refrigerated storage.

The stabilized resoles of this invention are prepared by the skillful manipulation of the urea formaldehyde reaction to form products that are fully water soluble and that when present in the resole greatly inhibit the crystallization of tetra dimer even in the presence of tetra dimer seed cyrstals and at storage temperatures as low as 0° C. for periods exceeding one month.

The unwanted methylol urea reaction products formed by the addition of urea to the resole under neutral or mildly alkaline conditions in the present, state-of-the art way are prevented from forming or eliminated by a carefully timed polymerization reaction between the added urea and the free formaldehyde in the resole. This reaction is carried out under carefully controlled conditions of acidic pH, temperature, and formaldehyde-to-urea molar ratio, to accomplish the desired purpose.

The resulting clear liquid product is very low in free phenol, typically no more than 0.5%, very low in free formaldehyde, typically no more than 0.1%, and has a tolerance to water exceeding 5,000%. The percent of water tolerance is the weight of dilution water added based on the liquid weight of resin. When a liquid has a water tolerance exceeding 5000%, it is said to be fully water dilutable or infinitely water dilutable. In addition, the product remains homogeneous, traslucent, fully water dilutable and free of any crystalline sediments when stored for one month at 0° C.

One important and novel aspect of the invention is therefore considered to be introducing what is believed to be a methylene urea polymer into the aqueous resole solution by adding from 20% to 100% urea based on the weight of resole solids in the solution, or from 0.3 to 3.0 moles of urea per mole of free or uncombined formaldehyde, dissolving the urea in the solution at a relatively low temperature in the range of 40°-50° C., and then acidifying the solution with a suitable acid to a pH in the range of 3.5-4.5 while the temperature is again maintained at a slightly elevated level, generally in the range of from 10° C. to 50° C. The acidic reaction is allowed to proceed for a predetermined short period of time, so that after neutralization with a suitable base the molecular weight of the resulting methylene urea polymer is low enough to remain dissolved in the resole solution. In addition, the methylene urea polymer provides the inhibiting effect necessary to prevent tetra dimer crystallization when the storage temperature of the product is reduced to the preferred range of 0° C. to 5° C. necessary to maintain high water tolerance.

DESCRIPTION OF THE PREFERRED EMBODIMENTS

The fully water-dilutable and storage stable resole-urea compositions of the present invention are prepared by a two-stage reaction.

First Stage-Alkali Catalyzed Resole Production

The first stage involves the well-known preparation of a resole by the aqueous alkaline methylolation of phenol with formaldehyde at relatively high temperatures from 40°-70° C. and at relatively high pH's of 8.5-9.5. These conditions promote the reaction as indicated by a decrease in the concentrations of formaldehyde and of phenol. Virtually any strongly basic substance that does not react with the formaldehyde and that is soluble in water may be used to promote the reaction. These bases include the alkali metal oxides, the alkaline earth metal oxides, and low molecular weight tertiary amines such as triethyl amine.

The alkaline earth metal oxides are the preferred catalysts. Alkaline earth metals are electropositive and divalent and therefore promote ortho substitution. Ortho substitution is activating and therefore leads to a faster rate of trimethylol phenol formation or to more complete methylolation at lower temperatures than are obtained with the monovalent alkali metal oxides or with triethyl amine. These latter materials do not influence the condensation reaction and therefore lead to higher rates of para condensation, which is deactivating. In addition to being deactivating, which is by itself undesirable, para-substituted methylol phenol is enormously more susceptible to further condensation with other para-substituted methylol phenols. This causes premature diphenyl methane formation, which in turn causes premature oligomerization with a resulting loss of water tolerance before very low levels of free phenol are obtained in the aqueous solution.

The base catalyst is therefore preferably selected from the group consisting of magnesium, calcium, and barium oxides. One mole of phenol is condensed with 1.5 to 6 moles of aqueous formaldehyde until the free phenol content is in the range of 1.0%–2.0% of the original phenol content in solution before the base is added and the free formaldehyde content is in the range of 20%–40% of the original formaldehyde added.

The pH of the solution drops as the reaction proceeds, since the methylol phenols are more acidic than phenol. It is therefore necessary to add enough base to the solution to maintain the pH above 8.5 near the end of reaction, so that a significant portion of the low levels of the weaker acid phenol remaining will be ionized and reactive towards the formaldehyde. Typically from 0.05–0.3 mole equivalents of base per mole of phenol are added. Higher levels of base are undesirable, since alkali also catalyzes the condensation of the methylol phenols, leading to premature oligomerization and loss of water tolerance. Higher levels of base also increase costs since higher levels of acid are required for the acidification during the second stage of the reaction.

Second Stage-Acidic pH

The second or acid stage of the process follows the first stage of resole formation after the solution has been cooled below 40° C.

Urea is added to the cooled solution to provide a molar ratio of total phenol charged to the original solution to urea in the range of 0.20:1 to 2.0:1, and also a molar ratio of uncombined (free) formaldehyde to urea of 0.30:1 to 3.0:1. Additional formaldehyde necessary to complete the acid stage reaction may also be added at this point. However, it is more conveniently added at the beginning of the first or basic stage of the reaction. Once dissolution is complete after 1–10 minutes with vigorous agitation, the mixture is immediately acidified to a very low pH, in the range of 3.5 to 4.5, with sulfuric acid, sulfamic acid, or other suitable acid, depending mainly upon the base selected in the first stage of the reaction and the end use requirement for the product.

Although a large number of acids exist and might be used to obtain an aqueous solution pH in the desired range, their use may be undesirable because: (a), many acids such as carbonic, phosphoric, oxalic or citric form insoluble precipitates in the aqueous solution with the metal ion used to prepare the resole, which precipitate must be filtered off, or suitably suspended; and (b), many acids such as carbonic, phosphoric, and organic carboxylic are weak acids whose basic salts are buffers which form when the acid stage reaction is stopped by returning the pH to near 7.0. With a strong base, the buffers thus formed severely interfere with the final acidification, which is usually carried out with ammonium sulfate immediately prior to application of the diluted binder to the glass fibers. A final acidification of the binder is critical to the rapid copolymerization and solidification of the resole and urea components of the binder, where residence times of the blended glass fiber binder mat in the hot air curing oven may be as short as 20 to 30 seconds. Binder solutions containing significant amounts of pH buffers therefore will not readily attain in the curing oven a desirable acidic curing pH unless large amounts of acid are added immediately prior to application. In other cases, however, where the residence times of the blended glass fiber binder product in the oven may be much longer, such as in the manufacture of fiberglass pipe insulation, the use of buffer forming acids is acceptable since good copolymerization and solidification of the binder occurs without the use of ammonium sulfate.

The acidification reaction is thus carried out in the temperature range of 20°–40° C. for a carefully preselected time period determined by observing second stage reaction samples. If the second stage reaction is neutralized too soon, samples show large amounts of crystalline sediment after 16 hours at 0° C. in the presence of tetra dimer seed crystals. If the second stage reaction is neutralized too late, the samples become severely turbid solutions before the reaction is neutralized. The turbidity is believed to be due to higher molecular weight methylene urea. The particles causing the turbidity do not readily dissolve in cold dilution water. In contrast, a sample reaction of the same ingredients, neutralized in the optimum time period in accordance with this invention remains translucent and free of any sediment for prolonged periods of time exceeding one month at 0° C.

The inhibiting effect of what is believed to be methylene urea polymer produced in accordance with the present invention upon tetra dimer crystal growth and rapid sedimentation may be observed by carefully comparing the acidic reaction samples neutralized after different reaction time periods from a very short time period to an intermediate time period, to a very long time period. It is noted that neutralized reaction samples taken from the very short time period turn turbid rapidly at low temperature in the presence of seed crystals and also settle rapidly so that after 16 hours at 0° C. a clear, translucent liquid remains above a large amount of compact light yellow sediment. The reaction samples taken from an intermediate time period may also become turbid in the presence of seed crystals, and may remain homogeneously turbid and free of sediment for extended periods of time exceeding one week at 0° C. A sediment that may eventually form after one week at 0° C., is not compact and in some cases occupies more than ten times the volume of sediment obtained in the short reaction time period sample. Finally, reaction samples taken from the very long time period do not form sediment but remain homogeneously turbid at 0° C. for periods of time exceeding six months. In addition, it is found that the low viscosity liquid suspension obtained from the very long reaction time period gradually thickens in storage coincident with a gradual change in sample color from dark brown to light yellow. After several months' storage at 0° C., the liquid finally gels from what is believed to be coprecipitation of tetra dimer as indicated by the change in color. Remarkably, however, the gel almost immediately reverts without agitation to the dark brown low viscosity liquid suspension upon warming to room temperature. These observations provide a good indication of the enormously increased solubility of tetra dimer in the presence of the methylene urea polymer.

Further, it is found that the low viscosity liquid suspension obtained from the very long reaction time period sample can readily be dissolved in warm water at 50° C. even after several months in storage to produce a clear solution, whereas the sample obtained from the very short reaction time period requires vigorous agitation to disperse the sediment and is very difficult to dissolve, requiring temperatures in excess of 80° C.

The process of inhibiting crystal growth in supersaturated solutions of sparingly soluble salts such as calcium carbonate and associated physical phenomena that arise therefrom is well known to those skilled in the art of preparing stabilized industrial boiler waters and cooling waters. Supersaturated solutions of calcium carbonate, for example, can be prepared by combining solutions of calcium chloride and sodium bicarbonate. These solutions normally produce a compact, caked, limestone sediment very shortly after mixing. These same solutions, however, when prepared with a few parts per million of a crystal growth inhibitor such as aminomethylene phosphonic acid, resist sedimentation and do not form caked sediments. Precipitation that does occur forms a flocculated sediment as opposed to an agglomerated, caked sediment and is readily dispersed. The tetra dimer sediment of the present invention accordingly occupies a much larger volume than the uninhibited tetra dimer sediment. It is also well known that the inhibiting effect is somewhat less concentrated supersaturated inorganic aqueous solutions may be so strong as to totally prevent precipitation of any kind. An analogous effect has been obtained in the organic aqueous solutions of the present invention.

The chemical structure and molecular weight of the urea formaldehyde reaction product of the present invention has not been determined. However, it has been shown by derivatization gas chromatography that the resole prepared in the first basic stage acts only as a solvent for the second acid stage of the preparation. The composition of the resole is determined by preparing BSTFA silylated derivatives of the methylolated phenols and methylolated diphenyl methanes which are volatile enough to be readily chromatographed. Samples derivatized and chromatographed immediately before, during and after the acid stage reaction show that selected methylol phenol ratios and methylol phenol to tetra dimer ratios remain unchanged throughout the acidification, indicating no reaction of tetra dimer or other resole components with the urea formaldehyde product of the second stage reaction.

These results have also been confirmed by $C_{13}$ NMR, where it has been shown that no methyl phenolic urea bonding occurs during the acidification step.

The difficulty associated with preparing what is believed to be such a methylene urea product will be appreciated by those skilled in the art of preparing urea formaldehyde adhesives since (a) the urea formaldehyde reaction occurring at such a low pH in the range from 3.5 to 4.5, proceeds very quickly with precipitation of very insoluble white methylene urea even at temperatures below 25° C., and (b) the methylols of phenol present in high concentrations in the water soluble resole of the present invention are alcohols of the hydroxy benzyl alcohol type and the solubility of many urea formaldehyde compositions in alcohol or an aqueous alcohol-containing solution like the present invention is very low and far less than its solubility in water or alcohol-free water. In spite of these difficulties, the preparation of a fully aqueous resole-soluble urea formaldehyde product has been accomplished, as shown by the following example.

In the following example, and throughout this specification, all parts and percentages are by weight, and all temperatures are in degrees Celsius, unless specifically stated to be otherwise.

EXAMPLE 1

Base Stage Reaction

A resole is prepared by combining 1 mole of molten phenol with 3.97 moles of 46.5% aqueous formaldehyde and 0.078 moles of calcium oxide at a temperature of 65° C. The reaction is cooled when two-thirds of the original formaldehyde has been consumed, as determined by the hydroxylamine hydrochloride test.

Acid State Reaction

The base stage resole is cooled to 40° C. and 1.0 mole of urea is added, followed by 0.13 mole of sulfamic acid to a pH of 4.0. The temperature of the reaction is maintained at 34° C., with cooling to remove exothermic heat.

After 30 minutes at pH 4 and 33°–34° C., 0.02 mole of 50% aqueous sodium hydroxide is added to raise the pH to 7.1. An additional 1.3 moles of urea are then added to improve the solubility of the urea formaldehyde condensate in the resole.

Lignin and threshold inhibitors are added to prevent calcium sulfate precipitation when ammonium sulfate is added (the final acidification step), to provide an acidic environment in the fiberglass curing oven.

Resin properties are summarized in Table I. The resin remains infinitely water-dilutable and free of sediment for one month when stored below 5° C.

TABLE 1

| Properties of the Resin of Example 1 | |
|---|---|
| % Free Formaldehyde: | 0.0% |
| % Free Phenol: | Less than 0.30% |
| % Owens Solids: | 54.7 |
| pH: | 7.05 |
| Specific Gravity: | 1.232 |
| Refractive Index: | 1.4714 |
| % Water Tolerance: | Infinite |

In Example 1, the acid stage reaction is carried out at pH 4 and at 33° C. to 34° C. for about 20 minutes. However, it is believed that a temperature range of 10° C. to 50° C. is operative, and that a pH range of 3.0 to 5.8 is operative. Presently, 20° C. to 40° C. is more preferred, with 30° C. to 35° C. most preferred. Similarly, a pH range of 3.5 to 4.5 is more preferred, with pH 3.8 to 4.2 most preferred from an ease-of-manufacture standpoint. It would seem that the pH, temperature and time of reaction are interdependent, and a plausible set of five conditions that might produce the same product over a 20 minute acidification time are:

pH 4.4–4.5 at 48° C. to 50° C.
pH 4.2–4.3 at 40° C. to 42° C.
pH 4.0–4.1 at 32° C. to 34° C.
pH 3.8–3.9 at 24° C. to 26° C.
pH 3.6–3.7 at 16° C. to 18° C.

The process should be operative at temperatures as low as 0° C. if a pH of about 3.0 were employed. However, at such a low temperature, it would be very difficult to obtain the product in a reasonable time.

EXAMPLE 2

Effect of Reaction Time at Low pH

In most fiberglass insulation manufacturing processes, where a urea-modified resole resin is used as the binder, it is common practice to form a premix of urea with the resole resin, and to conduct a reaction of the premix at near-ambient temperature and at a pH above 7.0. It is common to observe severe crystallization of dimethylol urea after about 10 hours at approximately room temperature. Moreover, if the free formaldehyde content is relatively low, and the storage temperature is reduced to preserve water tolerance, tetra dimer crystallization may also be a serious problem. In addition to these low temperature crystallization problems, low free phenol resins containing urea rapidly lose water tolerance at ambient storage temperatures of about 20° C.

The following procedure produces satisfactory binder resins and also eliminates the foregoing problems. In addition, the products are storage stable, eliminate the premix and prereaction steps that are normally required to be conducted by the insulation manufacturer, and also demonstrate the effect of reaction time on the reaction.

In this example, five phenolic resole-urea compositions were prepared from a single base stage resole resin, as will be described. First, a base staged resole resin was prepared according to the method described in Example 1. This resole had the characteristics shown in Table 2.

TABLE 2

| Characteristics of the Base Staged Resole Resin | |
|---|---|
| Molar Ratio p/f: | 3.967:1 |
| Refractive Index (R.I.) | 1.4642 |
| 25% Salt Water Tolerance: | 309% |
| % Free Formaldehyde: | 11.5% approx. |
| % Solids Content: | 40.1% approx. |
| pH: | 8.6 |

Then, 800 parts of the base staged resole resin were placed in a reactor and 97.4 parts of urea were added. These were permitted to react for 30 minutes at 40° C. and at a pH of 8.6, with agitation. The urea-modified resole was then cooled to 28° C., and acidified to pH 4.06 with 113.1 parts of a urea sulfamic acid premix. The premix had a ratio of 2.295:3.254:3.587 by weight of sulfamic acid to urea to water. An exothermic reaction occurred which raised the temperature to 33° C., where it was maintained. After 10 minutes at pH 4.06 and 33° C., portions of the resin composition formed was withdrawn from the reactor at five minute intervals. Each portion was in the amount of 202 parts. A total of five portions were obtained, after 10, 15, 20, 25, and 30 minutes, respectively. Each portion was immediately neutralized to a pH of 7.8 with 50% sodium hydroxide and immediately cooled with the addition of 36.7 parts of urea to thus form resole-urea composition. In this way, five phenolic resole-urea compositions were obtained.

Before neutralization, a 90% methanol-water tolerance measurement was made on each withdrawn sample. The measured tolerance value of each sample was later plotted against the time of the reaction at pH 4.06. A graph was prepared as shown in FIG. 1.

Further testing was then done using the portions of resole-urea composition formed as follows. To each portion was added 7.2 parts of a 40% concentration ammonium lignosulfonate and 0.4 parts of a threshold inhibitor premix to form a finished resole-urea binder. The ammonium lignosulfonate was obtained from Western Forest Products Ltd., Port Alice, B.C., Canada. The threshold inhibitor premix was formed from a 2:1 mix by weight of hydroxy ethylidene diphosphonic acid (Dequest 2010, Monsanto) and polyacrylic acid (Goodrite K752 from B. F. Goodrich), all of which is further diluted with an additional three parts of water.

Observations and measurements were made on each of the phenolic resole-urea compositions as each was formed. These observations and measurements are shown in Table 3. Also shown in the last set of entries in the Table are some water dilution values of these same compositions that were obtained at later times.

TABLE 3

| Effect of Time of Acid Reaction on Resin Properties | | | | | |
|---|---|---|---|---|---|
| | Resole Urea Binder No. | | | | |
| | 1 | 2 | 3 | 4 | 5 |
| Elapsed time @ pH 4.06: & 33° C., min. | 10 | 15 | 20 | 25 | 30 |
| Final pH | 7.02 | 7.06 | 7.05 | 7.03 | 7.06 |
| R.I.: | 1.4725 | 1.4727 | 1.4729 | 1.4728 | 1.4728 |
| Water Dilute: | All Infinite | | | | |
| 25% Salt Water Dilute: | 2.9:1 | 2.8:1 | 2.8:1 | 2.8:1 | — |
| Specific Gravity: | — | — | 1.234 | — | — |
| % Methanol Solids: | — | — | 54.80 | — | — |
| Water Dilute after: | | | | | |
| 72 hrs @ 18–20° C. | 21.7:1 | 18.2:1 | 15.7:1 | 12.3:1* | 11.6:1* |
| 7 days @ 18–20° C. | 7.7:1 | 7.2:1 | 7.2:1 | 6.7:1* | 6.7:1* |
| 11 days @ 0° C. | All Infinite | | | | |

*Sample decanted to remove all sediment.

When a sample of No. 5 was agitated with no decanting, the mixture had zero cold water dilutability.

The following will describe how the tests were made at later times at 0° C. The five resole-urea binder portions were placed in cold storage at 0° C. for observation. An aliquot of each sample was placed in a 25×250 mm test tube, and each tube of resin was monitored under a 120 watt microscope lamp. As the samples were placed in storage, each showed slight trace sequestrant turbidity. After three days of storage, all samples except sample 5 were crystal clear, with one inch of calcium threshold inhibitor sediment turbidity in eight inches of liquid. Sample 5 also showed the same sedimented turbid layer of calcium threshold inhibitor sediment, however, the liquid above the sediment was still turbid. After 11 days of storage, samples 1, 2 and 3 remained unchanged. Sample 5 was clear, with an additional one-half inch layer of sediment on top of the sequestrant layer. Sample 4 showed a trace of floc agglomerating and sedimenting.

After three days in storage at 0° C., approximately 40 grams of each sample were decanted from the sequestrant layer and placed in a 25×150 mm test tube. Approximately 5 mm of tetra dimer seed powder was then added to the ice-cold samples, without agitation, and the samples were again placed in storage. The seed powder gradually settled after approximately 60 minutes, producing a very thin layer of sediment. These samples were again monitored in storage at 0° C. as above. The results of these observations are summarized in Table 4 below.

sulted in further cooling of the batch to 38° C. after about five minutes, and an exothermic reaction then raised the batch temperature to 43° C. after about 15 minutes. The batch was then cooled to 26° C., 25 minutes after the urea had been added.

The resin batch was then acidified to pH 4.06 over a

TABLE 4

| | Observations on Seeded Resin Samples, Stored at 0° C. | | | | |
|---|---|---|---|---|---|
| | 1 | 2 | 3 | 4 | 5 |
| Days @ 0° C. w/added tetra dimer seed powder | | | | | |
| 1 | clear significant crystallization sediment | clear no crystallization trace crystallization trace floc | clear no crystallization no crystallization ultra trace floc | clear no crystallization no crystallization significant floc | turbid no crystallization no crystallization significant floc sediment |
| 3 | turbid thick layer crystallization sediment | | | | |
| 7 | | same as after 3 days | | | |
| Days at 0° C. | | | | | |
| 100 | ½ inch of totally solidified sediment layer below 3½ inches of clear liquid | ¼ inch of dense but not solidified sediment layer below ¼ inch of floc sediment, all below 3½ inches of clear liquid | ¾ inch of readily dispersible floc sediment below 3¼ inches of clear liquid | one inch of readily dispersible floc sediment below three inches of clear liquid | |

The results reported in Table 4 demonstrate that the preferred elapsed reaction time at the acid pH and at 33° C. is 20 minutes. However, samples 2 and 4 were acceptable, indicating that reaction times in the range from about 15–25 minutes also led to acceptable products. It is believed that acceptable products would be produced during this reaction time in all of the pH and temperature ranges suggested in Example 1 above. Samples 2–4 are acceptable since the trace amount of floc would not plug the glass fiber adhesive application equipment.

The sediments of samples 4 and 5 are of the readily dispersable type, while the sediments of samples 1 and 2 are not readily dispersable.

EXAMPLE 3

Preparation of a Urea-Modified Phenolic Resole Binder Suitable for Use with Glass Fiber Insulation During this resin preparation process, careful control was maintained over the three process variables of time, temperature, and pH during the acidification step. The objective was to employ a time within the range of 15–20 minutes, at a temperature of 32°–34° C., and at a pH in the narrow range of 4.0 to 4.1. A further objective was to produce a resin product free from dimer crystallization and without U-F polymer precipitation, which objective was successfully achieved. A lime-catalyzed phenol formaldehyde resin was prepared having a molar ratio of phenol to formaldehyde of 3.967:1. The properties of the resin are summarized in Table 5 below.

TABLE 5

| Phenolic Resole Resin Properties | |
|---|---|
| 25% Salt Water Tolerance: | 330% |
| Refractive Index: | 1.4664 |
| % Free Formaldehyde: | 10.92 |
| Total Cook Time, mins.: | 215 |

This resin batch of 646 pounds was cooled to 45° C., and 78 pounds of urea were added. This addition reperiod of 40 minutes by adding 96 pounds of the acid premix. The resin was held at pH 4.06 and 32° C. for about 15 minutes before neutralizing to pH 7.6 with four pounds of 50% caustic soda. During this 15 minute holding period, the acid reaction went forward.

After the acid reaction had been permitted to go forward for about 10 minutes, that is, five minutes before neutralizing it, the 90% methanol-water tolerance was 185%.

After neutralization, 148 pounds of urea and 29 pounds of 40% lignin were added. The finished resin binder was then screened through a 150 mesh U.S. Standard Sieve screen, to remove any agglomerates, into two lined drums. The filled drums were then placed in storage at 5° C.

Finished binder properties are shown in Table 6 below:

TABLE 6

| Finished Binder Properties | |
|---|---|
| % Methanol Solids: | 54.56% |
| Specific Gravity: | 1.233 |
| Refractive Index: | 1.4721 |
| pH: | 7.06 |
| % Ash | 2.02% |
| % Free Formaldehyde (by ammonium thiocyanate method) | 0.00% |
| Water dilute after days at R.T. (18–21° C.) | |
| 1 | Inf. |
| 2 | Inf. |
| 4 | 12:1 |
| U/F Polymer Precipitation: after 7 days at 0° C. | None |
| Dimer Crystallization: after 7 days at 0° C. with added tetra dimer seed powder | None |

EXAMPLE 4

Proposed Commercial Manufacturing Procedure

Commercial-size batches are preferably prepared in a stainless steel reactor equipped with a vacuum addition line that protrudes well below the contemplated surface of the liquid resin in the reactor. The vacuum addition line is intended for use in adding lime and a sulfamic acid-urea premix. The equipment should also include a comparatively smaller stainless steel sulfamic acid premix tank equipped with a stainless steel agitator, an inlet for steam injection, a thermometer, and a urea addition line.

To make a batch of finished resin product having a weight of approximately 52,000 pounds, the large stainless steel reactor is charged with 9,437 pounds of 92% phenol, with 23,637 pounds of 46.5% formaldehyde, and with 120 pounds of water. After mild agitation for a few minutes, the refractive index should be checked. It should fall within 1.4270 to 1,4280.

The phenol-formaldehyde reaction batch is then cooled to 40° C. After checking the pH to insure that it is below 7.0, the reactor is placed under vacuum and cooling water is applied to the reactor callandria and to the overhead condenser. Using the vacuum addition line, three 55-pound bags of lime are added, while the resin is agitated. After about 15 minutes, with the batch temperature at about 40° C., the first addition, of five additions of lime, is made. The additions are made at the rate of one 55-pound bag every 15 minutes. After each addition, the batch is cooled back to 40° C. and held at 40° C. Additional lime is not added if the temperature exceeds 40° C.

About 15 minutes after the time of the fifth addition, the temperature of the resin is permitted to rise to 68° C. If the exothermic reaction is insufficient to cause this temperature rise during a period of about 30 minutes, steam is applied if necessary. The batch is then held at 68° C. for about 60 minutes.

After 30 minutes of being held at 68° C., it is advisable to begin monitoring the dilutability of the resin in a 25% sodium chloride solution every 10 minutes.

After the resin is held at 68° C. for about 60 minutes, it is cooled to 65° C. It is useful at this point to start preparing a graph of resin dilutability in 25% sodium chloride solution against the elapsed time. Five minutes after a dilutability of 4:1 is observed, the resin is rapidly cooled to 45° C. and the percentage of free formaldehyde is determined; it should be in the range from 11.5% to 12.0%. Once the resin has been cooled to 45° C., 4,089 pounds of urea are added as the resin is agitated. The resin is then held for 20–30 minutes at 40° C. After about 20 minutes at 40° C., the batch is cooled rapidly to 26° C. Once the 26° C. temperature has been attained, cooling is stopped and an acid premix is added using the vacuum addition line, so that the premix is added below the surface of the resin. The premix is added at a rate not in excess of about 250 pounds per minute. The premix is composed of 1,193 pounds of sulfamic acid, 1,692 pounds of urea, and 1,855 pounds of water. Upon completion of the addition of the premix, the addition line is flushed with water. As the premix is added to the resin batch, an exothermic reaction occurs that will increase the temperature of the resin batch. The temperature should be permitted to rise to about 32° C.

At this point, the pH of the batch should be in the range from 4.0 to 4.1. If necessary, small additional amounts of the acid premix can be added to achieve a pH in this narrow range. The pH should not be permitted to drop below 4.0, however, since highly insoluble methylene urea will form rapidly.

The resin batch is held at 32° C. and at a pH in the narrow range from 4.0 to 4.1 for about 20 minutes. During this time, the dilutability of the resin is monitored every five minutes, in 90% methanol-water solution. After 20 minutes at 32° C. and at pH 4.0–4.1, or five minutes after a dilutability of 1.9:1 is observed, whichever comes first, about 250 pounds of 50% concentration sodium hydroxide is added. The amount of sodium hydroxide employed may be more or less than 250 pounds, since the objective is to achieve a pH in the range from 7.5 to 7.7. At that pH, 7,711 pounds of urea and 1,505 pounds of red lingin liquor are added. The lignin is a commercial spent sulfite liquor sold by Western Forest Products Ltd., Port Alice, B.C., Canada. The pH is again adjusted, after allowing time for equilibration, to be in the range 7.1 to 7.3, using additional small amounts of sodium hydroxide or formic acid, as necessary.

The resin batch was then discharged to cold storage through a 150-mesh screen. In the cold storage tank, with the agitator running, the resin batch was cooled to 5° C., then 15.6 pounds of Dequest 2010 sequestering agent and Goodrite K752, diluted with 70.2 pounds of water, were slowly added at a rate of about two gallons per minute. Upon completion of the addition, the resin was stirred for five minutes for homogeneity. Preferably, this final addition is made to the resin just prior to shipment. To prepare the resin for cold storage, the pH should be adjusted, if necessary, to be in the range 7.0 to 7.2, using small amounts of 50% caustic soda or 85% formic acid, as necessary.

Storage temperatures below 10° C., and preferably below 5° C., should be used for this resin.

This finished resin product can be expected to be essentially stable during reasonable periods of cold storage time. After 30 days, the resin should be little changed from its initial condition. The use of a resin of this type eliminates the need to have urea addition and mixing facilities at the customer's location.

EXAMPLE 5

Actual Production Procedure for a Commercial Run

For convenience, the amounts of the several components employed in this manufacturing process are expressed as percentages by weight of the total weight of all components used.

A clean, stainless steel rector was charged with 18.149% of a 92.0% concentration phenol; 45.455% of a 46.5% concentration formaldehyde, and 0.239% water. This charge was cooled to 40° C. The pH was checked to be sure it was below 7.0. Full vacuum was then applied to the reactor, and maximum cooling water pressure was maintained on both the reactor callandria and on the overhead condenser.

The next step involved the addition of lime. Since an exothermic reaction occurs when the lime concentration exceeds 0.55%, extreme care must be used to avoid adding more than the designated amount. If, during the course of the reaction, the rate of temperature rise at any time exceeds 1.0° C. per minute, an uncontrollable exothermic reaction may develop, and it may be necessary to quench the batch with water. That did not happen in this particular case, however. Lime (anhydrous calcium oxide) was added to the reactor in the amount of 0.773%, using incremental additions to avoid localized unduly heated regions. The lime used was packaged in 55-lb. bags, which were added at a rate of about one 55-lb. bag every 15 minutes. After each bag was added, the temperature of the reaction mixture was adjusted by cooling back down to about 40° C. or less. For safety reasons, lime should not be added if the temperature of the reaction mixture is above about 40° C.

After an elapsed time of about 90 minutes, the reaction mixture in the reactor was allowed to rise in temperature to 68° C. While this temperature was reached by utilization of the heat of reaction, stand-by steam was ready for use if needed. Cooling should be applied if necessary to maintain the temperature of the reaction mixture at a value not above 68° C., since resin dilutability will decrease very rapidly if this temperature is exceeded. Once the 68° C. temperature has been attained, it is held as constant as feasible for about 60 minutes.

After the reaction mixture has been held at 68° C. for about 30 minutes, monitoring of the dilutability of the resin in 25% sodium chloride solution was begun, and took place at 10 minute intervals. After 60 minutes at 68° C., the batch was cooled to about 65° C. over a period of about 30 minutes.

During the intervals between monitoring the dilutability of the resin in 25% sodium chloride solution, the values for resin dilutability were prepared in graph form, plotting resin dilutability in 25% salt solution against elapsed time at 68° C. Five minutes after a dilutability of 4:1 was observed, the resin was rapidly cooled to 45° C., and the free formaldehyde content of the resin was determined. It was found to be in the range from 11.5% to 12.0%.

When the reaction mixture was cooled to 45° C., the first urea addition was made, in the amount of 7.864%. The reaction mixture was then held at 40° C. for a period of from about 20 minutes to about 30 minutes. At the end of this time, the reaction mixture was rapidly cooled to 26° C.

At this time, as a precaution, the proper desired amount of sodium hydroxide was weighed up, for eventual use. The amount was 0.480% of a 50.0% concentration sodium hydroxide solution.

When the reaction mixture reached 26° C., cooling was stopped. A previously prepared premix of: sulfamic acid, 2.295%; urea, 3.254%; and water, 3.587%; was added slowly to the reactor, at a rate no faster than 250 lbs./min., the addition being made below the surface of the reaction mixture. Upon completion of the insertion of the premix into the reaction mixture, the addition line was flushed with water. A part of the indicated amount of water was set aside for this purpose, so that the 3.587% indicated water component of the premix represents the total amount of any water used in the premix and of the flush water.

After the addition of the premix, the batch of the reaction mixture was allowed to exotherm to 32° C. The pH was then adjusted to 4.0 to 4.1 by adding additional small amounts of the premix. The pH was not allowed to drop below 4.0, since highly insoluble methylene urea would rapidly form at such a low pH. The reaction mixture was then held at 32° C. and at the adjusted pH for about 20 minutes. The dilutability of the batch in 90% methanol-water solution was monitored by a test made every five minutes.

After about 20 minutes at 32° C. and at the adjusted pH, the previously weighed 0.480% of the 50% solution of sodium hydroxide was added. This addition adjusted the pH to 7.5 to 7.7. As an alternative production technique, the sodium hydroxide may be added five minutes after a dilutability of 1.9:1 is observed.

At this time an additional amount of 14.829% of urea, and an amount of 2.895% of a 40% solution of Port Alice red liquor (lignin) were added. The pH was adjusted to be in the range from 7.1 to 7.3. The contents of the reactor were then discharged to cold storage through a 150-mesh screen.

A premix was prepared for future addition to the cold resin. The premix consisted of 0.030% of Dequest 2010, 0.135% water, and 0.015% Goodrite K752. The trademark "Dequest 2010" is used by Monsanto to identify its hydroxyethylidene diphosphonic acid. The trademark "Goodrite K752" is used by B. F. Goodrich to designate its polyacrylic acid product.

This premix was added slowly to the chilled resin product of the invention, at a rate not in excess of about two gallons per minute. Upon completion of the addition of the premix, mixing was continued for about five minutes. It is preferred that this particular premix be added to the chilled resin just prior to shipment.

During storage, the pH should be monitored and adjusted to be within the range from 7.0 to 7.2 by the additional small amounts of 50% caustic or 80% formic acid, as necessary.

The resin was further formulated prior to use by the addition of ammonium sulfate and silane. As delivered for evaluation, the properties of the binder are as reported below in Table 7.

TABLE 7

| Finished Binder Properties | |
|---|---|
| Solids Content | 54.5% |
| pH | 7.05 |
| Free Phenol | <0.5% |
| Free Formaldehyde | 0.26% |
| Specific Gravity | 1.232 |
| 135° C. Gel Time Neat Resin | 13.8 minutes |
| Binder Formula | Resin +2% ammonia sulfate +0.2% silane |
| Binder Stroke Cure | |
| B Stage | 3.8 minutes |
| C Stage | 7.1 minutes |

The evaluation of the binder was that its bonding performance was equivalent to or better than a conventional binder. This is particularly remarkable, since one-half of the adhesive solids component of the binder was derived from urea. That the bonding performance is equivalent to or better than a prior art binder is particularly remarkable, since a conventional binder that was evaluated for comparison, only one-third of the adhesive solids component was derived from urea. Moreover, humidity testing produced excellent results.

CONCLUSION

Some experimental work has been conducted in an effort to determine the chemical nature of the urea modified phenolic resin of this invention. It is concluded that the acid reaction appears to accelerate the formation of methylene urea and dimethylene ether urea polymer, which also occurs to a significant extent without acidification. No evidence of phenol-urea bonding was found. It appears that the highly advantageous low temperature storage properties and performance properties of the resin of this invention may be attributable to the fact that the urea-formaldehyde polymer that is formed in situ at an acidic pH in the phenolic resin inhibits dimer crystallization and has a reduced tendency to homopolymerize, with consequent increased copolymerization in the final curing (hardening) of the resin in the fiberglass oven.

Urea-formaldehyde polymer formation occurring under neutral or mildly alkaline pH conditions results in the rapid loss of water tolerance, dimethylol urea crystallization, no inhibition of dimer crystallization, and no reduced tendency toward urea-formaldehyde homopolymer formation.

At the present time, it is not possible to say with certainty what chemical reactions occur during the process of this invention, and to what extent. This knowledge would be of some interest, since the resinous products of the invention exhibit superior performance properties as well as superior low temperature storage stability and unusual and superior humidity resistance. However, it is postulated that the formulation of methylene urea groups during the acidification step, with the consequent reduction in the terminal methylol urea content of the product, reduces the tendency toward urea-formaldehyde homopolymerization, and increases the copolymerization of urea formaldehyde with phenol formaldehyde. This appears to be a possible explanation of what goes on during the acidification step, since the very rapid homopolymerization reaction proceeds through methylol urea, while the much slower copolymerization reaction is believed to proceed through methylol phenol and unsubstituted urea groups. This hypothesis tends to be supported in the literature. Also, test results show that the hot plate cure of one preferred product, made in accordance with the present invention, takes a much longer time than would normally be expected for an ordinary, prior art "pre-reacted" product.

As further evidence, it is recognized that methylol urea liberates formaldehyde from urea-formaldehyde adhesives, while methylene urea is much more stable. A methylene urea resole would therefore be expected to liberate less formaldehyde in the curing oven than a methylol urea resole. During an evaluation trial of a binder made in accordance with the present invention, formaldehyde testing of the ambient air near the oven exit indicated that formaldehyde levels in the air decreased from an average of 2.3 ppm using ordinary methylol urea resole, to an average of 0.68 ppm when the binder was prepared in accordance with one preferred embodiment of the present invention. The industrial hygienic benefits of resin binders prepared in accordance with the present invention can therefore be substantial.

Probably the most important advantage of the invention is improved binder performance. This is believed to be a direct result of the formation of methylene urea. Other advantages, that are attributable to the low temperature second stage acidification reaction, include increased copolymerization, reduced oven emissions, the elimination of dimethylol urea crystallization, and the elimination of tetra dimer crystallization.

While the invention has been disclosed in this patent application by reference to the details of a preferred embodiment of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for making a resinous binder that is substantially cold storage stable, characterized by showing no signs of formation of hard insoluble phases for periods in excess of about 24 hours at temperatures of about 0° C. to 15° C., said process comprising:

adding a source of urea to an aqueous phenolic resole solution that contains free formaldehyde, to obtain a mixture, said aqueous phenolic resole solution having a temperature in the range of about 10° C. to about 50° C., wherein the molar ratio of free formaldehyde to available urea within said aqueous phenolic resole solution is in the range of from 0.3:1 to 3.0:1, acidifying said mixture to a pH of 3.0 to 5.8 for from about 15 to 40 minutes while maintaining the temperature of the mixture within the range of about 10° to 50° C., and then neutralizing said mixture.

2. The process of claim 1 wherein the acid pH is above 4.0.

3. The process of claim 2 wherein the acid pH is in the range from 4.0 to 4.1.

4. The process of claim 2 wherein the resinous binder product obtained following neutralization of said mixture is a clear liquid containing less than 0.5% free phenol and having a water tolerance exceeding 5,000%, wherein water tolerance is the weight of dilution water which can be added to the resinous binder product, based on the liquid weight of the resin, without the formation of an insoluble phase.

5. A process for making a resinous binder that is substantially stable in cold storage at 0° C. to 15° C. for at least 30 days, comprising:

dissolving in an aqueous resole solution, that contains free formaldehyde, from 0.3 to 3.0 moles of urea per mole of free formaldehyde, at 20° C. to 40° C., then acidifying said solution to a pH of 3.5 to 4.5 while maintaining the temperature at 20° C. to 40° C., and holding the solution in said pH range and in said temperature range for a sufficient period of time so that upon neutralization of said solution, the resole solution retains good solubility and is characterized by good inhibition of tetra dimer crystallization during cold storage at 0° C. to 15° C. such that any precipitate which forms comprises a flocculated sediment that is readily dispersed upon agitation.

6. The process of claim 5 wherein the pH of said acidified solution is not less than 4.

7. The process of claim 6 wherein the temperature at which the acidified solution is held is in the range from 30° C. to 35° C.

8. The process of claim 7 wherein the time during which said acidified solution is held in said pH range is from 15 minutes to 20 minutes.

9. The process of claim 8 wherein the temperature at which said acidified solution is held is in the range from 33° C. to 34° C., for a time of about 20 minutes, at a pH in the range from 4.0 to 4.1.

10. The process of claim 5 wherein said solution is acidified by the addition of sulfuric acid, sulfamic acid, formic acid, acetic acid, or equivalent acidifying agent.

11. The process of claim 8 wherein said solution is acidified using sulfuric acid or sulfamic acid.

12. The process of claim 9 wherein said solution is acidified using sulfamic acid.

13. The process of claim 11 including the added step of adding additional urea to said neutralized product in sufficient amount to improve the solubility of the urea-formaldehyde condensate present in said product, and further extend said resole with unsubstituted urea, to increase copolymerization.

14. The process of claim 13 wherein the free formaldehyde content of said product is less than about 0.5%.

15. The process of claim 14 wherein the free phenolic content of said product is less than 0.5% and the water tolerance is above 5,000%, wherein water tolerance is the weight of dilution water which can be added to the resinous binder product, based on the liquid weight of the resin, without the formation of an insoluble phase.

16. A process for making a water soluble composition comprising:
   (a) preparing a phenolic resin containing free formaldehyde;
   (b) adding urea to said phenolic resole wherein the temperature of said phenolic resole is in the range of about 10° C. to 50° C.;
   (c) acidifying to a pH in the range of about 3.5 to about 4.5;
   (d) maintaining said acidic pH for from about 5 minutes to about 60 minutes while maintaining a temperature of about 10° C. to 50° C.;
   (e) neutralizing with a base to neutral or slightly basic pH, and then
   (f) adding a second amount of urea.

17. The process of claim 16 in which said acidifying step is accomplished by adding sulfuric acid, sulfamic acid, or other equivalent acid.

18. The process of claim 17 in which said phenolic resole resin is an alkali-catalyzed resole with a free formaldehyde content of 11%–12% by weight of the liquid resole.

19. The process of claim 16 wherein said resole is prepared from reactants having an initial phenol to formaldehyde molar ratio in the range from 1:1.5 to 1:6, that are reacted to reduce the free phenol content to from 1.0% to 2.0% of the original phenol content.

20. The process of claim 19 wherein said phenol and formaldehyde reactants for the resole are reacted to reduce the free formaldehyde to be in the range from 20% to 40% of the original amount of formaldehyde.

21. The process of claim 20 in which said phenolic resole resin is an alkali-catalyzed resole having a free formaldehyde content of 11% to 12% by weight of said liquid resole.

22. The process of claim 21 in which said acidifying step is accomplished by adding sulfuric acid, sulfamic acid, or other equivalent acid.

23. The process of claim 22 in which said step of maintaining the mixture of urea with said phenolic resole at an acid pH is carried out for from about 15 minutes to about 25 minutes.

24. A process for making a water soluble resin composition comprising the steps of:
   (a) in a first, alkaline reaction stage, preparing a resole solution by the aqueous alkaline methylolation of a phenol with formaldehyde at 40° C.–70° C. and 8.5–9.5 pH using a molar ratio of the phenol to formaldehyde of 1:1.5 to 1:6 and reacting until the free phenol is in the range of 1.0%–2.0% of the original phenol by weight, and the free formaldehyde is in the range of from 20% to 40% of the original amount of formaldehyde by weight;
   (b) cooling said resole to at least 40° C. or below;
   (c) in a second, acidic reaction stage, dissolving urea in said resole solution, in an amount such that the molar ratio of total phenol to urea used to prepare said resole is in the range from 0.20:1 to 2.0:1 and such that the molar ratio of free formaldehyde to urea is from 0.3:1 to 3.0:1, then
   (d) acidifying to a pH of 3.5 to 4.5 with cooling to maintain a temperature in the range from 20° C. to 40° C.,
   (e) maintaining the pH at about 3.5 to 4.5 for from about 5 minutes to about 60 minutes, and then
   (f) adjusting the pH to an essentially neutral value.

25. The process of claim 24 wherein said acidifying step is accomplished by adding sulfuric acid or sulfamic acid.

26. The process of claim 25 including the additional step of adding an additional amount of urea to said neutralized, modified resole product, to improve the solubility of the thus-modified resole.

27. The process of claim 25 wherein the pH in the acidic reaction stage is at least 4.0.

28. The process of claim 27 including the additional step of adding additional urea to the neutralized resole to improve the solubility of the methylene urea polymer in the resole and to further extend the resole.

29. The process of claim 28 comprising maintaining said acidified urea-resole solution in said pH range to permit the formation of a methylene-urea polymer in sufficient amount to inhibit sedimentation and crystal formation in the modified resole product during cold storage at 0° C. to 15° C.

30. A water soluble, cold storage stable resinous composition characterized by showing no signals of formation of hard insoluble phases for periods in excess of about 24 hours at temperatures of about 0° C. to 15° C., said composition comprising a phenolic resole containing free formaldehyde as prepared, that has been (1) reacted with a first amount of urea under acidic conditions of pH 3.5 to 4.5 and a temperature of from 10° C. to 50° C., wherein the molar ratio of free formaldehyde to urea added is in the range of from 0.3:1 to 3.0:1, (2) neutralized, and (3) further extended thereafter with a second amount of urea under neutral or slightly basic conditions.

31. A water soluble, cold storage stable resinous composition characterized by showing no signs of formation of hard insoluble phases for periods in excess of about 24 hours at temperatures of about 0° to 15° C., said composition comprising two resinous components comprising (1) a methylene urea polymer and (2) a phenolic resole, both being dissolved in an aqueous vehicle, said methylene urea polymer being present in sufficient amount that sedimentation and crystalization are inhibited during cold storage of said composition at 0° C. to 15° C. for periods in excess of 24 hours, said methylene urea polymer being produced by reaction of free formaldehyde within the aqueous vehicle and urea at a temperature in the range of about 10° C. to 50° C., at a pH of 3.0 to 5.8, for a period of from 15 to 40 minutes while maintaining the temperature of the mixture within the range of about 10° C. to 50° C., wherein the molar ratio of free formaldehyde to urea is in the range of from 0.3:1 to 3.0:1.

32. A water soluble, cold storage stable composition made by two successive additions of urea to a phenolic resole containing free formaldehyde as prepared, such that after said first urea addition in an amount which provides a molar ratio of free formaldehyde to urea in the range of 0.3:1 to 3.0:1, essentially any reaction proceeds under acidic conditions at a pH of 3.0 to 5.8 and a temperature of about 10° C. to 50° C., said acidic conditions being brought about by the addition of a non-buffer-forming, a non-precipitate-forming acid, said second addition of urea being made after a return to neutral or slightly basic conditions brought about by the addition of base.

33. An aqueous solution of a urea-modified resole that, after one month of storage at 0° C., is substantially free of sediment and remains substantially infinitely water-dilutable, said composition comprising:
 a methylene urea polymer in a common aqueous vehicle with a phenolic resole, said polymer being formed by the addition of urea to a phenolic resole that contains free formaldehyde, in the proportion of 0.3 to 3.0 moles of urea per mole of free, uncombined formaldehyde in the resole, at a temperature of 10° C. to 50° C., and by the subsequent addition of an acidic material to adjust the pH to about 3.0 to about 5.0 while maintaining a temperature of about 10° C. to 50° C., and permitting the reaction to go forward for from 5 minutes to 60 minutes, to permit the formation of a methylene urea polymer, then adjusting the pH to a neutral or slightly basic value, the amount of said polymer, after neutralization, inhibiting sedimentation and crystallization during cold storage at 0° C. to 5° C.

34. The composition of claim 33 further comprising said polymer being formed at a temperature in the range from 20° C. to 40° C.

35. The composition of claim 34 further comprising adjusting said pH to about 3.5 to about 4.5 by the addition of said acidic material.

36. The composition of claim 35 wherein said polymer is formed during an acidic reaction following the addition of said acidic material, at a pH of at least 4.0.

37. The composition of claim 35 further comprising said polymer being formed at a temperature of 30° C. to 35° C.

38. The composition of claim 37 wherein said polymer is formed after adjusting said pH to about 3.8 to about 4.2.

39. The composition of claim 38 wherein said pH is from about 4.0 to 4.1, and said acidified reaction has gone forward for about fifteen to thirty minutes.

40. The composition of claim 38 comprising a clear liquid product containing not more than 0.6% free phenol and not more than 1% free formaldehyde based on total liquid weight of said liquid product, and containing at least 51% non-volatile organic binder solids, said clear liquid product having a water tolerance exceedng 5,000% and remaining fully water dilutable after storage for one month at 0° C.

41. A liquid, cold storage stable, urea-modified resole that (1) is characterized by showing no signs of formation of hard insoluble phases for periods in excess of about 24 hours at temperatures of about 0° C. to 15° C. (2) is soluble in cold water (3) contains 30%–70% by weight of solids comprising a methylolated phenol solution and 20%–80% urea, based on the total non-volatile organic solids content of said solution, and (4) is prepared by forming a methylene urea polymer in solution with the methylolated phenol solution by:
 (a) adding sufficient urea to an alkali-catalyzed resole having a temperature in the range of about 10° C. to 50° C. and a free formaldehyde content between 11% and 12% to obtain a free formaldehyde to urea mole ratio of 0.3:1 to 3.0:1;
 (b) adjusting the pH to 3.5–4.5 with a sulfuric acid or sulfamic acid solution while maintaining a temperature of about 10° C. to 50° C.;
 (c) maintaining said pH for 5 to 60 minutes to form enough methylene urea polymer to inhibit sedimentation and crystallization in the neutralized product, and then
 (d) neutralizing with a strong base, adding additional urea, and refrigerating.

* * * * *